(12) United States Patent
Taylor (10) Patent No.: US 7,028,622 B2
(45) Date of Patent: Apr. 18, 2006

(54) APPARATUS FOR BURNING PULVERIZED SOLID FUELS WITH OXYGEN

(75) Inventor: Curtis L. Taylor, Gaston, IN (US)

(73) Assignee: Maxon Corporation, Muncie, IN (US)

( * ) Notice: Subject to any disclaimer, the term of this patent is extended or adjusted under 35 U.S.C. 154(b) by 17 days.

(21) Appl. No.: 10/407,489

(22) Filed: Apr. 4, 2003

(65) Prior Publication Data

US 2004/0194681 A1    Oct. 7, 2004

(51) Int. Cl.
*F23D 1/00* (2006.01)
(52) U.S. Cl. .................................. 110/265; 110/263
(58) Field of Classification Search ............... 110/260, 110/261, 262, 263, 264, 265, 347; 431/187, 431/181, 8, 10, 350; 239/419.5, 421, 424, 239/424.5, 425.5, 419
See application file for complete search history.

(56) References Cited

U.S. PATENT DOCUMENTS

| 1,754,603 | A | * | 4/1930 | Brown ..................... 431/181 |
| 2,215,079 | A | * | 9/1940 | Hess ........................ 122/6.5 |
| 2,275,555 | A |   | 3/1942 | Power |
| 3,123,127 | A | * | 3/1964 | Willott ...................... 431/186 |
| 3,182,712 | A | * | 5/1965 | Zink et al. ................. 431/177 |
| 3,511,587 | A | * | 5/1970 | Hilger et al. .............. 431/160 |
| 4,257,762 | A | * | 3/1981 | Zink et al. ................. 431/177 |
| 4,556,384 | A | * | 12/1985 | Laurenceau et al. ........ 431/160 |
| 4,679,512 | A | * | 7/1987 | Skoog ........................ 110/347 |
| 4,928,605 | A |   | 5/1990 | Suwa et al. |
| 5,199,355 | A | * | 4/1993 | Larue ......................... 110/261 |
| 5,338,186 | A | * | 8/1994 | Sulzhik et al. ............. 431/115 |
| 5,431,559 | A |   | 7/1995 | Taylor |
| 5,458,483 | A |   | 10/1995 | Taylor |
| 5,624,253 | A | * | 4/1997 | Sulzhik et al. ............. 431/116 |
| 5,944,507 | A | * | 8/1999 | Feldermann ............... 431/189 |
| 6,152,051 | A | * | 11/2000 | Kiyama et al. ............ 110/262 |
| 6,206,949 | B1 |   | 3/2001 | Kobayashi et al. |
| 6,238,206 | B1 |   | 5/2001 | Cummings, III et al. |
| 6,394,043 | B1 |   | 5/2002 | Bool, III et al. |
| 6,394,790 | B1 |   | 5/2002 | Kobayashi |
| 2003/0009932 | A1 |   | 1/2003 | Kobayashi et al. |

FOREIGN PATENT DOCUMENTS

| FR | 1113263 | * | 11/1955 |
| GB | 2085575 A | * | 4/1982 |
| JP | 10-73208 | * | 8/1996 |

OTHER PUBLICATIONS $No_x$ *Reduction from a 44-MW Wall-Fired Boiler Utilizing Oxygen Enhanced Combustion*, Bool and Kobayashi, date unknown, 7 pages.

(Continued)

*Primary Examiner*—Kenneth Rinehart
(74) *Attorney, Agent, or Firm*—Barnes & Thornburg LLP (57) ABSTRACT

A burner assembly combines oxygen and fuel to produce a flame. The burner assembly includes an oxygen supply tube adapted to receive a stream of oxygen and a fuel supply tube arranged to extend through the oxygen tube to convey a stream of fluidized, pulverized, solid fuel into a flame chamber. Oxygen flowing through the oxygen supply tube passes through oxygen-injection holes formed in the fuel supply tube and then mixes with fluidized, pulverized, solid fuel passing through the fuel supply tube to create an oxygen-fuel mixture in a downstream portion of the fuel supply tube. This mixture is discharged into the flame chamber and ignited in a flame chamber to produce a flame.

8 Claims, 9 Drawing Sheets

OTHER PUBLICATIONS

*CFD Modeling and Pilot Scale Validatino of Oxy-Coal Combustion,* Chui, Douglas, and Tan, date unknown, 12 pages.
*Reduce heater $NO_x$ in the burner,* Seebold, Hydrocarbon Processing, Nov. 1982, pp. 183-186.
*A Review of Experimental Findings in Oxy-fuel Combustion at the CANMET Vertical Combustor Research Facility,* Tan, Douglas, and Chui, date unknown, 13 pages.
*Oxygen Enrichment in Boilers,* Marin, Bugeat, Macadam, and Charon, 19 pages, date unknown.
*A Study on $CO_2$ Capture from a Gas-fired Boiler by Oxyfuel Combustion without Flue Gas Recycle,* Boden, Palkes, Thompson, 2001 Joint AFRC/JFRC/IEA International Combustion Symposiuum, Sep. 0-12, 2001, 10 pages.
*Development of an Advanced, Low-Emissions, Multi-Fuel Oxygen Burner,* Taylor, 55th Conference on Glass Problems, The Ohio State University, Nov. 8-9, 1994, 24 pages.
PCT International Search Report, forms PCT/ISA/210/220 (5 pages), Nov. 8, 2004, PCT/US04/02957.
PCT Written Opinion form PCT/ISA/237 (6 pages), Nov. 8, 2004, PCT/US04/02957.

* cited by examiner

APPARATUS FOR BURNING PULVERIZED SOLID FUELS WITH OXYGEN

BACKGROUND AND SUMMARY

The present disclosure relates to burner assemblies, and particularly to oxygen-fuel burner assemblies. More particularly, the present disclosure relates to pulverized solid fuel combustion systems.

Many types of coal and other solid fuels can be burned successfully in pulverized form. Coal is pulverized and delivered to fuel-burning equipment and then combusted in a furnace to produce heat for various industrial purposes.

A burner is used to "fire" pulverized coal and other solid fuels. In a direct-firing system, the coal is delivered to the burner in suspension in a stream of primary air, and this mixture must be mixed with a stream of secondary air at the burner.

One challenge facing the burner industry is to design an improved burner that produces lower nitrogen oxide emissions during operation than conventional burners. Typically, an industrial burner discharges a mixture of fuel and either air or oxygen. A proper ratio of fuel and air is established to produce a combustible fuel and air mixture. Once ignited, this combustible mixture burns to produce a flame that can be used to heat various products in a wide variety of industrial applications. Combustion of fuels such as natural gas, oil, liquid propane gas, low BTU gases, and pulverized coals often produce several unwanted emissions such as nitrogen oxides ($NO_x$), carbon monoxide (CO), and unburned hydrocarbons (UHC).

According to the present disclosure, a burner assembly is provided for combining oxygen and fluidized, pulverized, solid fuel to produce a flame. The burner assembly includes an oxygen supply tube adapted to receive a stream of oxygen and a fuel supply tube arranged to extend through the oxygen supply tube to convey a stream of fluidized, pulverized, solid fuel into a flame chamber. Oxygen flowing through the oxygen supply tube passes through oxygen-injection holes formed in the fuel supply tube and then mixes with fluidized, pulverized, solid fuel passing through the fuel supply tube. Thus, an oxygen-fuel mixture is created in a downstream portion of the fuel supply tube and discharged into the flame chamber. This mixture is ignited in the flame chamber to produce a flame.

In illustrative embodiments of the disclosure, the fuel supply tube extends into and through the oxygen supply tube to define an annular oxygen flow passage extending around and along an annular exterior surface of the fuel supply tube in a direction toward the flame chamber. Oxygen flows through this annular oxygen flow passage to reach outer oxygen-inlet openings in the oxygen-injection holes formed in the annular exterior surface of the fuel supply tube.

In one embodiment, the fuel supply tube includes a solid-fuel conduit and an oxygen-fuel nozzle coupled to the solid-fuel conduit and formed to include the oxygen-injection holes. Oxygen and fluidized, pulverized, solid fuel are mixed in the nozzle to create a combustible mixture that is then discharged into the flame chamber and ignited to produce a flame.

In illustrative embodiments of the disclosure, means is provided for mixing some of the oxygen extant in the oxygen flow passage provided in the oxygen supply tube with the oxygen-fuel mixture that is discharged from the fuel supply tube into the flame chamber. In this case, a first portion of the oxygen flowing through the oxygen flow passage is mixed with the stream of fluidized, pulverized, solid fuel just before that fuel exits the fuel supply tube and a remaining portion of the oxygen flowing through the oxygen flow passage is mixed with the oxygenated steam of fluidized, pulverized, solid fuel in a region located outside the fuel supply tube and near an oxygen-fuel outlet opening formed in the fuel supply tube to provide supplemental oxygen to that oxygenated fuel stream.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIGS. 4–9 illustrate six additional embodiments of a distal portion of the oxygen fuel nozzle module shown in FIG. 2 and configured to be located in the flame chamber of the burner block and discharge or vent an oxygen-fuel mixture into the flame chamber;

FIG. 13 is a sectional view (similar to FIGS. 2 and 12) of a third embodiment of an oxygen burner unit according to the present disclosure wherein an oxygen-fuel nozzle according to the present disclosure is mounted in an oxygen supply tube to extend into a tube receiver passageway formed in a burner block to lie at an inlet port into a flame chamber also formed in the burner block and wherein (1) a portion of the oxygen extant in the oxygen supply tube is premixed with fluidized, pulverized, solid fuel in the oxygen-fuel nozzle and mixed with oxygenated, fluidized, pulverized, solid fuel just beyond an oxygen-fuel outlet opening formed in the nozzle and (2) another portion of the oxygen extant in the oxygen supply tube is "staged" to bypass the flame chamber by flowing through bypass passageways formed in the burner block to reach the flame at a point outside of the burner block.

DETAILED DESCRIPTION

Figure 1:
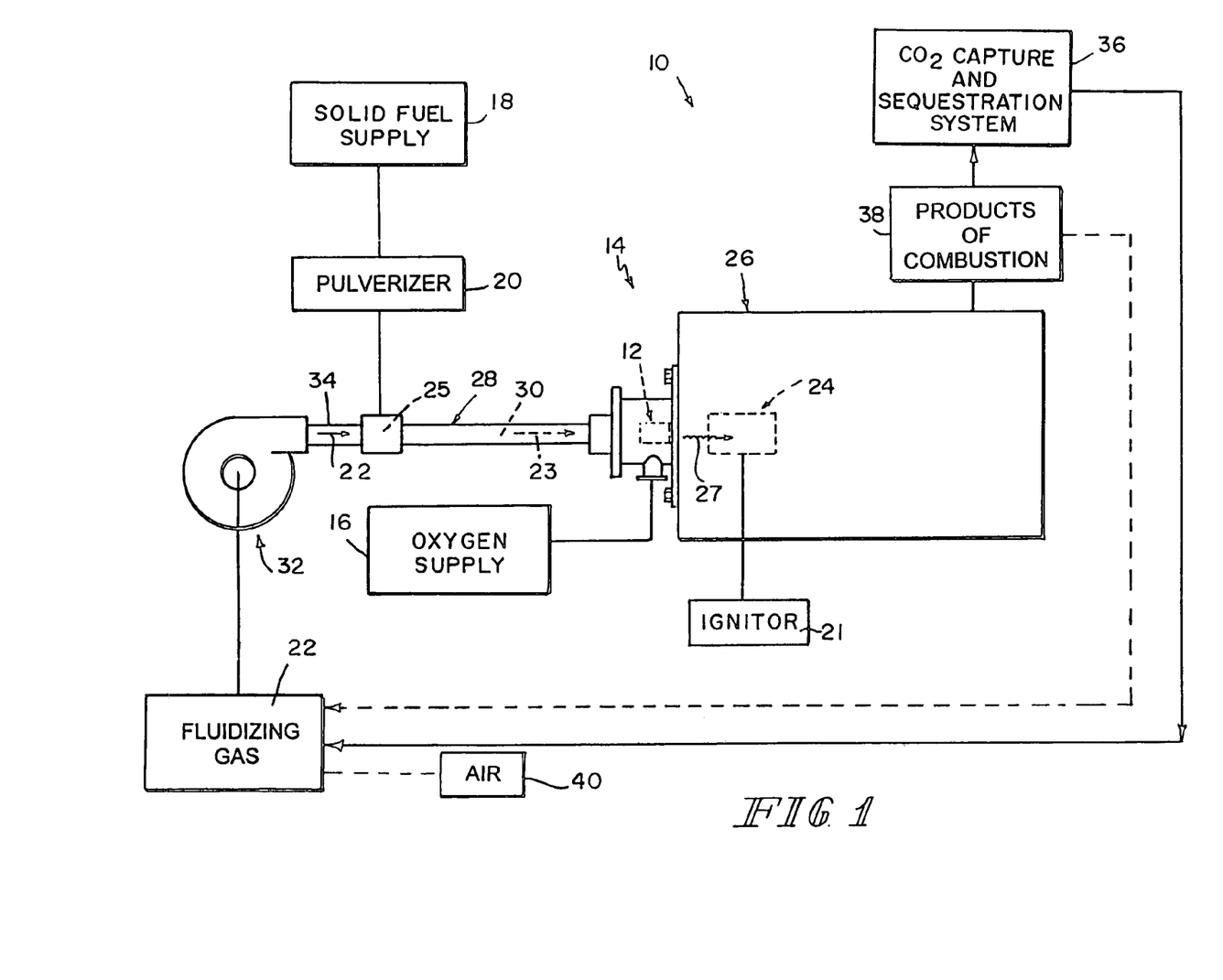
FIG. 1 is a schematic diagram showing an oxygen-fuel combustion system for pulverizing and fluidizing a solid fuel to be fired in an oxygen burner unit in accordance with the present disclosure.
Figure 2:
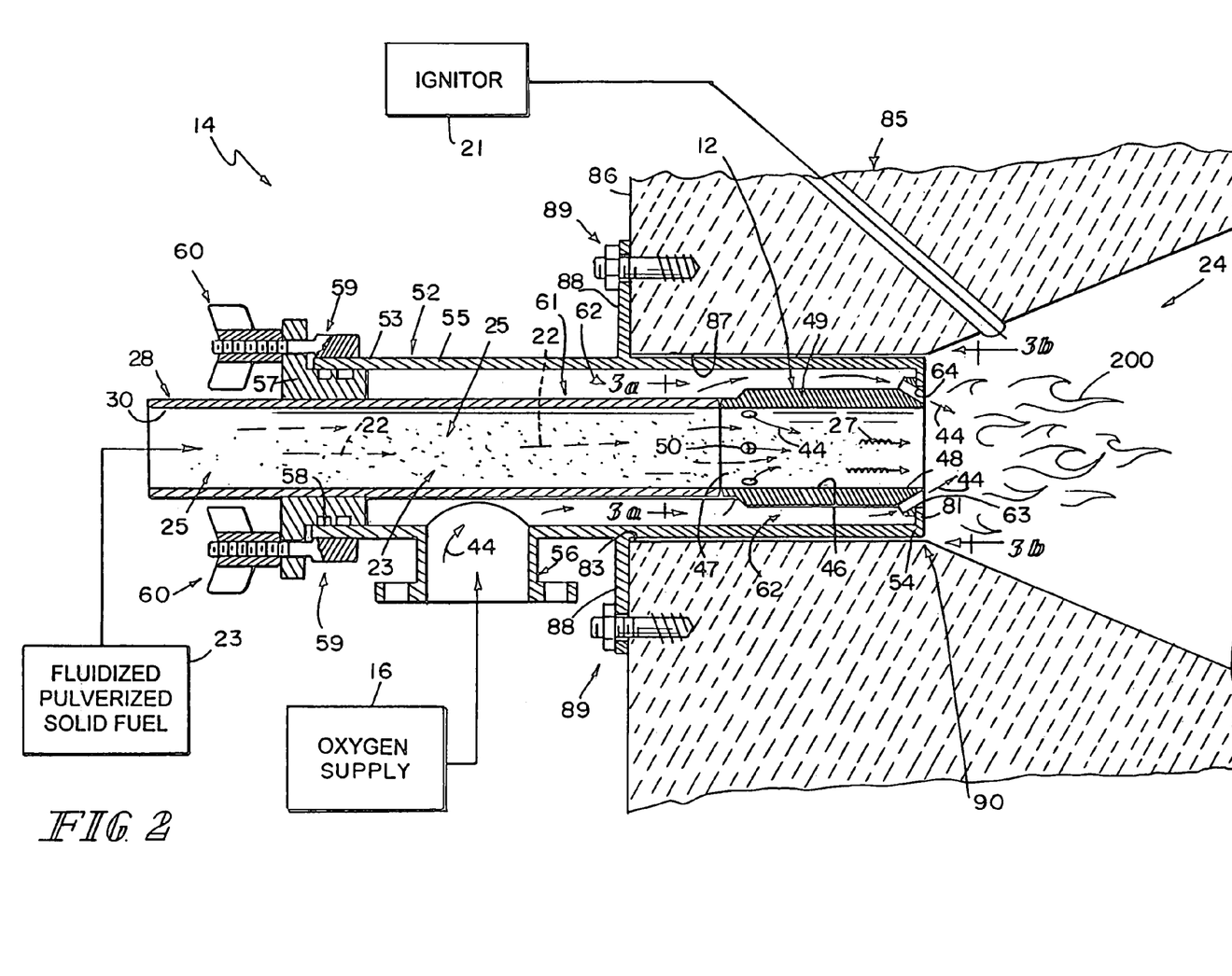
FIG. 2 is a sectional view of a portion of the oxygen burner unit illustrated in FIG. 1 showing a burner block formed to include a flame chamber and an oxygen supply tube containing a fuel supply tube including an oxygen-fuel nozzle formed to include means for conducting oxygen extant in an oxygen flow passage provided in the oxygen supply tube into a stream of fluidized, pulverized, solid fuel passing through the fuel supply tube prior to combustion of an oxygen-fuel mixture discharged from the fuel supply tube in the flame chamber.
Figure 10:
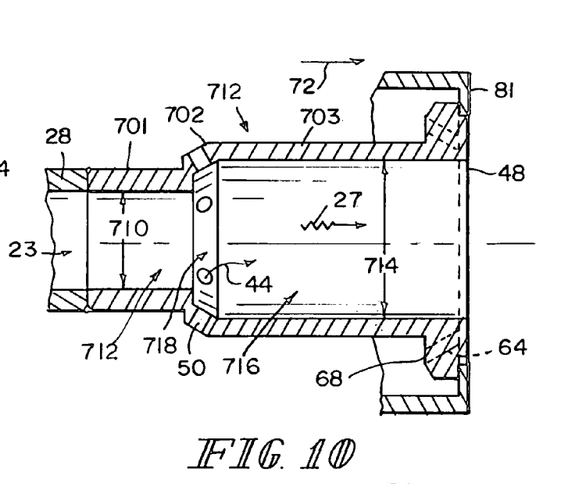
FIG. 10 is a sectional view of an eighth embodiment of an oxygen-fuel nozzle.
Figure 11:
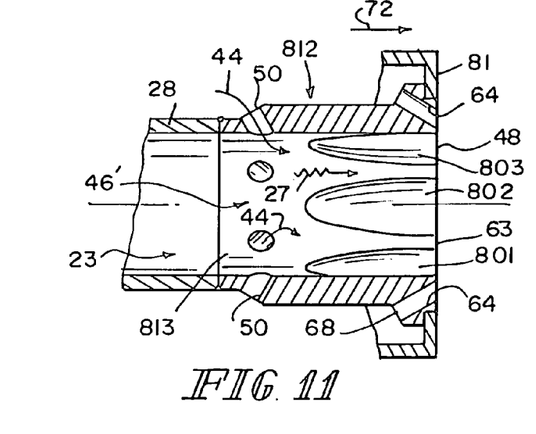
FIG. 11 is a sectional view of a ninth embodiment of an oxygen-fuel nozzle.

An oxygen-fuel combustion system 10 for burning a mixture of oxygen and a fluidized, pulverized, solid fuel to produce a flame 200 is shown schematically in FIG. 1. As used herein, "oxygen" means pure oxygen and any oxidant or oxygen-enriched mixture having an oxygen concentration of about 30% or more. An oxygen-fuel nozzle 12 is provided in a burner assembly 14 to mix oxygen from oxygen supply 16 with solid fuel from solid fuel supply 18 after the solid fuel is pulverized using a pulverizer 20 and fluidized using a fluidizing gas 22. The oxygenated, fluidized, pulverized, solid fuel 27 is then discharged into a flame chamber 24 provided in a burner unit 26 to produce a flame 200. Illustrative burner assemblies 14, 114, and 214 are shown in FIGS. 2, 10, and 11, while illustrative oxygen-fuel nozzles 12, 112, 212, 312, 412, 512, and 612 are shown in FIGS. 3–9.

A solid-fuel conduit 28 is formed to include a fuel transport passageway 30 for conveying pulverized solid fuel discharged from pulverizer 20 to oxygen-fuel nozzle 12. A blower 32 or other suitable apparatus or system is used to discharge fluidizing gas 22 into an upstream end 34 (or other suitable portion) of solid-fuel conduit 28 to fluidize the pulverized solid fuel 25 that is admitted into fuel transport passageway 30. Fluidizing gas 22 is used to fluidize and convey the pulverized solid fuel 25 through oxygen-fuel nozzle 12 and into flame chamber 24. Oxygen provided by oxygen supply 16 is conducted to oxygen-fuel nozzle 12 to be mixed with fluidized, pulverized, solid fuel 23 that has exited solid-fuel conduit 28 to create a combustible oxygen-fuel mixture 27 that is ignited in flame chamber 24 using a suitable ignitor 21 to produce a flame.

Many gases are suitable for use in fluidizing pulverized solid fuel discharged into fuel transport passageway 30. In one illustrative embodiment, a carbon dioxide ($CO_2$) capture and sequestration system 36 is used to capture carbon dioxide generated during combustion in burner unit 26 so that the captured carbon dioxide is used as the fluidizing gas 22. In another illustrative embodiment, the products of combustion 38 generated during combustion in burner unit 26 provide fluidizing gas 22. In yet another illustrative embodiment, air 40 from any suitable source is used as the fluidizing gas 22.

Oxygen-fuel combustion system 10 is configured to allow the burning of any solid fuel, or waste fuel, that can be pulverized or ground and conveyed by air or gas. Just as pulverized coal can be conveyed by air or carbon dioxide, solid fuels such as lignite, sawdust, agricultural wastes, ground shells, etc. could be burned in oxygen-fuel combustion system 10 to produce a flame 200 and to satisfy many industrial heating or other needs.

Burner assembly 14 is shown in greater detail in FIG. 2. A fluidized, pulverized, solid fuel 23 (comprising fluidizing gas 22 and pulverized solid fuel 25) is conveyed through fuel transport passageway 30 formed in solid-fuel conduit 28 and into oxygen-fuel nozzle 12 coupled to a downstream end 42 of solid-fuel conduit 28 as shown in FIG. 2. In an illustrative embodiment, there is insufficient oxygen extant in fluidized, pulverized, solid fuel 23 to sustain combustion. As suggested in FIG. 2, oxygen-fuel nozzle 12 is configured to allow oxygen 44 flowing outside oxygen-fuel nozzle 12 to pass into the stream of fluidized, pulverized, solid fuel 23 flowing through oxygen-fuel nozzle 12 to create a combustible oxygen-fuel mixture 27 that is then discharged into the flame chamber 24 located downstream of the oxygen-fuel nozzle 12.

Figures 3, 3A, 3B, 4, 4A, 4B:
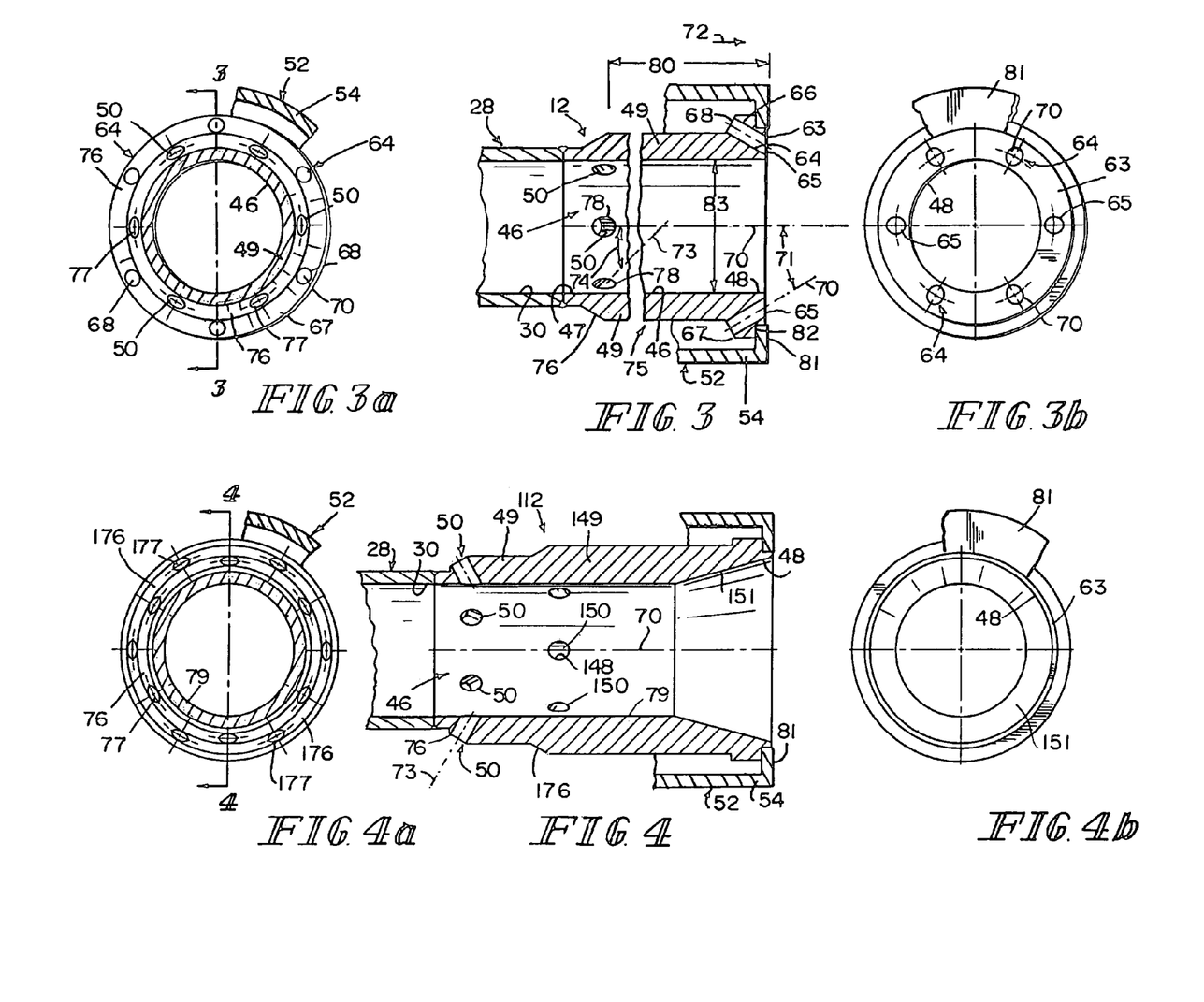
FIG. 3 is an enlarged sectional view of a portion of the oxygen-fuel nozzle shown in FIG. 2.
FIG. 3a is an enlarged sectional view taken along line 3a—3a of FIG. 2.
FIG. 3b is an enlarged elevation view taken along line 3b—3b of FIG. 2.
FIG. 4 is a sectional view of a second embodiment of an oxygen-fuel nozzle.
FIG. 4a is a sectional view similar to FIG. 3a of the embodiment of FIG. 4.
FIG. 4b is an elevation view similar to FIG. 3b of the embodiment of FIG. 4.

As shown in FIGS. 2 and 3, oxygen-fuel nozzle 12 is formed to include an oxygen-fuel transport passageway 46, a fuel inlet opening 47 located to admit fluidized, pulverized, solid fuel 23 discharged from fuel transport passageway 30 into oxygen-fuel transport passageway 46, and an oxygen-fuel outlet opening 48 located to discharge oxygen-fuel mixture 27 into flame chamber 24. Nozzle 12 includes an annular wall 49 lying between inlet and outlet openings 47, 48. Annular wall 49 is formed to include upstream oxygen-injection holes 50 arranged to conduct oxygen 44 flowing outside nozzle 12 into oxygen-fuel transport passageway 46 to mix with fluidized, pulverized, solid fuel 23 flowing in oxygen-fuel transport passageway 46 toward oxygen-fuel outlet opening 48 to establish a combustible oxygen-fuel mixture 27 flowing in oxygen-fuel transport passageway 46 and exiting through oxygen-fuel outlet opening 48. Ignitor 21 is used to ignite the combustible oxygen-fuel mixture 27 in flame chamber 24 to produce flame 200. Upstream oxygen-injection holes 50 are positioned to lie in circumferentially spaced-apart relation to one another around annular wall 44 of oxygen-fuel nozzle 12 as suggested in FIGS. 3 and 3a.

Burner assembly 14 further includes an outer tube 52 configured and arranged to conduct oxygen 44 along a path to reach at least oxygen-injection holes 50 as shown, for example, in FIG. 2. Outer tube 52 includes a first end 53, a second end 54, and an annular side wall 55 lying between first and second ends 53, 54. Side wall 55 is formed to include an oxygen inlet 56 adapted to receive oxygen 44 from oxygen supply 16. It is within the scope of this disclosure to relocate oxygen inlet 56 to any suitable location on outer tube 52. A sealed closure 57 mates with first end 53 of outer tube 55 to block flow of oxygen 44 through an opening 58 formed in first end 53 so that oxygen 44 admitted into outer tube 52 through oxygen inlet 56 will flow toward oxygen-injection holes 50. Suitable anchors 59 and anchor-engaging fasteners 60 are configured to retain sealed closure 57 in a fixed position on outer tube 52 as suggested in FIG. 2.

Solid-fuel conduit 28 and oxygen-fuel nozzle 12 cooperate to define a fuel supply tube 61 that extends into and through a passageway defined by annular side wall 55 of outer tube 52. Annular side wall 55 lies in concentric, spaced-apart relation to fuel supply tube 61 to define an annular oxygen flow passage 62 therebetween as shown, for example, in FIG. 2. Oxygen 44 admitted into outer tube 52 via oxygen inlet 56 flows through oxygen flow passage 62 and into oxygen-fuel transport passageway 46 formed in nozzle 12 through oxygen-injection holes 50.

Oxygen-fuel nozzle 12 further includes an annular outlet end face 63 formed to include oxygen-fuel outlet opening 48 as shown, for example, in FIGS. 2, 3, and 3b. Nozzle 12 is also formed to include oxygen-discharge passages 64 arranged to conduct oxygen 44 from oxygen flow passage 62 through openings 65 formed in outlet end face 63 to cause oxygen 44 discharged from the oxygen-discharge passages 64 to mix outside of oxygen-fuel nozzle 12 with the combustible oxygen-fuel mixture 27 discharged from oxygen-fuel transport passageway 46 through oxygen-fuel outlet opening 48. Six, for example, oxygen-discharge passages 64 are arranged in circumferentially spaced-apart relation to one another around the circumference of nozzle 12 as suggested in FIGS. 3, 3a, and 3b.

In the embodiment shown in FIGS. 2 and 3, nozzle 12 includes a radially outwardly extending annular rim 66 including an upstream-facing frustoconical wall 67 formed to include an inlet opening 68 for each oxygen-discharge passage 64. Each of oxygen-discharge passages 64 is angled to extend along a centerline 69 that cooperates with a centerline 70 of oxygen-fuel transport passageway 46 to form a first acute included angle 71 therebetween as shown, for example, in FIG. 3. As suggested in FIGS. 3, 3a, and 3b, the centerlines 69 of the oxygen-discharge passages 64 are arranged in a frustoconical pattern to converge in a downstream direction 72 extending toward outlet end face 63 on centerline 70.

Each upstream oxygen-injection hole 50 is angled to extend along a centerline 73 that cooperates with centerline 70 of oxygen-fuel transport passageway 46 to form a second acute included angle 74 therebetween. In the illustrated embodiment, angle 74 is greater than angle 71. As suggested in FIGS. 3, 3a, and 3b, the centerlines 73 of the upstream oxygen-injection holes 50 are arranged in a frustoconical pattern to converge in downstream direction 72 extending toward outlet end face 63 on centerline 70.

In the embodiment shown in FIGS. 2, 3, and 3a, nozzle 12 includes a radially outwardly extending annular sleeve 75 including an upstream facing frustoconical wall 76 formed to include an inlet opening 77 for each oxygen-fuel injection hole 50. The holes 50 conduct oxygen 44 from oxygen-flow passage 62 through outlet openings 78 formed in a cylindrical interior surface 79 (on annular wall 49) defining oxygen-fuel transport passageway 46.

As suggested in FIG. 3, each oxygen-fuel injection hole 50 is located a distance 80 from outlet end face 63 of nozzle 12. It is within the scope of this disclosure to vary the length of nozzle 12 (as well as the length of the other nozzles 112, 212, 312, 412, 512, 612 is disclosed herein) to establish a predetermined length of distance 80 to control the point along the length of fuel supply tube 61 and prior to oxygen-fuel outlet opening 48 at which oxygen 44 begins to mix with fluidized, pulverized, solid fuel 23 flowing through oxygen-fuel transport passageway 46 in downstream direction 72. In other words, distance 80 can be varied to control mixing of oxygen 44 with fuel 23. In the embodiment shown in FIG. 2, distance 80 is greater than diameter 83 of oxygen-fuel transport passageway 46.

As shown, for example, in FIGS. 2 and 3, an annular lip 81 is appended to downstream end 54 of outer tube 52. Annular lip 81 extends in a radially inward direction to fit into an annular notch 82 formed in nozzle 12 at outlet end face 63. Annular lip 81 functions to mate with nozzle 12 in annular notch 82 to block flow of any significant discharge or leakage of oxygen 44 from oxygen flow passage 62 within outer tube 52 to the surroundings through downstream end 54 of outer tube 52.

Referring again to FIG. 2, oxygen-fuel combustion system 10 further includes a burner block 85 formed to include an outer wall 86, flame chamber 24, and a tube receiver passageway 87 extending from an opening 83 formed in outer wall 86 to flame chamber 24. Outer tube 52 extends into tube receiver passageway 87 to position oxygen-fuel nozzle 12 in tube receiver passageway 87. This arrangement causes combustible oxygen-fuel mixture 27 flowing in oxygen-fuel transport passageway 46 and exiting through oxygen-fuel outlet opening 48 to pass into flame chamber 24. A mounting flange 88 is appended to outer tube 52 and held in mating engagement with outer wall 86 of burner block 85 using fasteners 89 to retain downstream portion 54 of outer tube 52 in tube receiver passageway 87 and (in the illustrated embodiment) retain oxygen-fuel outlet opening 48 formed in outlet end face 63 at a junction 90 between tube receiver passageway 87 and flame chamber 24. Burner block 85 is thus formed to provide flame chamber 24 with an inlet opening at junction 90 and a downstream outlet opening away from junction 90 as suggested in FIG. 2.

As shown in FIGS. 4, 4a, and 4b, an oxygen-fuel nozzle 112 is similar to oxygen-fuel nozzle 12 in that nozzle 112 also is formed to include upstream oxygen-injection holes 50. Nozzle 112 is also formed to include auxiliary oxygen-injection holes 150 located in a region between upstream oxygen-injection holes 50 and oxygen-fuel outlet opening 48. These auxiliary oxygen-injection holes 150 are arranged to conduct oxygen 44 flowing in oxygen flow passage 62 into oxygen-fuel transport passageway 46 to mix with and provide supplemental oxygen to the combustible oxygen-fuel mixture 27 flowing in passageway 46 and exiting through opening 48. Each of auxiliary oxygen-injection holes 150 is angled and circumferentially spaced and arranged in a frustoconical pattern as suggested in FIGS. 4, 4*a*, and 4*b*. Nozzle 112 further includes a radially outwardly extending annular sleeve 149 (on annular wall 49) including an upstream facing frustoconical wall 176 formed to include an inlet opening 177 for each auxiliary oxygen-injection hole 150. The holes 150 conduct oxygen 44 from oxygen flow passage 62 through outlet openings 148 formed in cylindrical interior surface 79 on annular wall 49. Nozzle 112 does not include any oxygen-discharge passages 64 but does include a frustoconical interior surface 151 diverging in downstream direction 72 and terminating at oxygen-fuel outlet opening 48.

Figures 5, 5A:
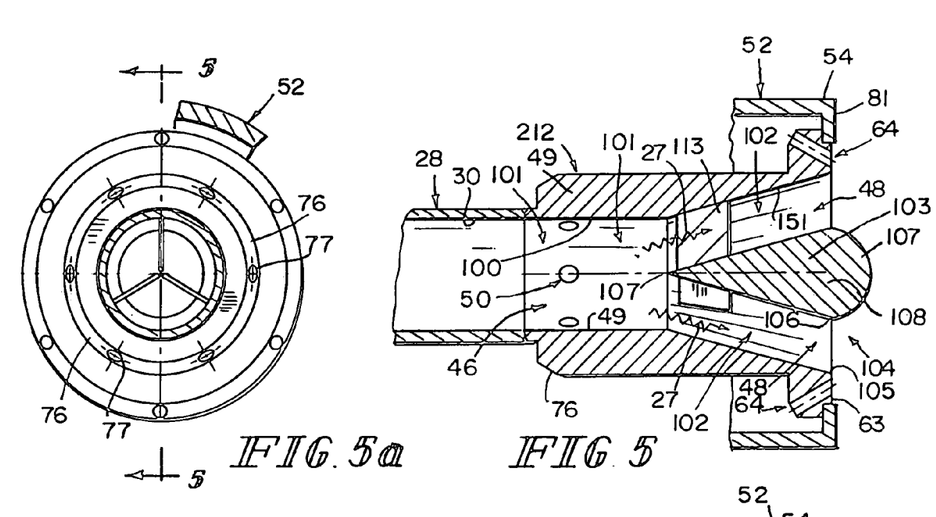
FIG. 5 is a sectional view of a third embodiment of an oxygen-fuel nozzle.
FIG. 5a is a sectional view similar to FIG. 3a of the embodiment of FIG. 5.
Figure 5B:
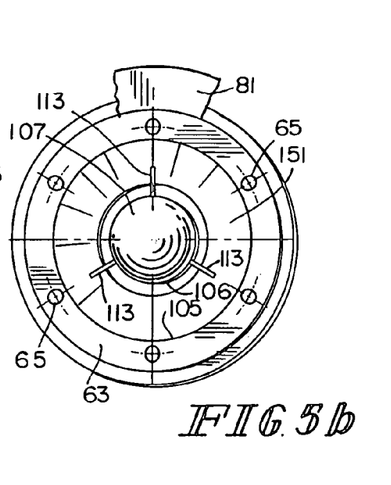
FIG. 5b is an elevation view similar to FIG. 3b of the embodiment of FIG. 5.
Figures 6, 6A:
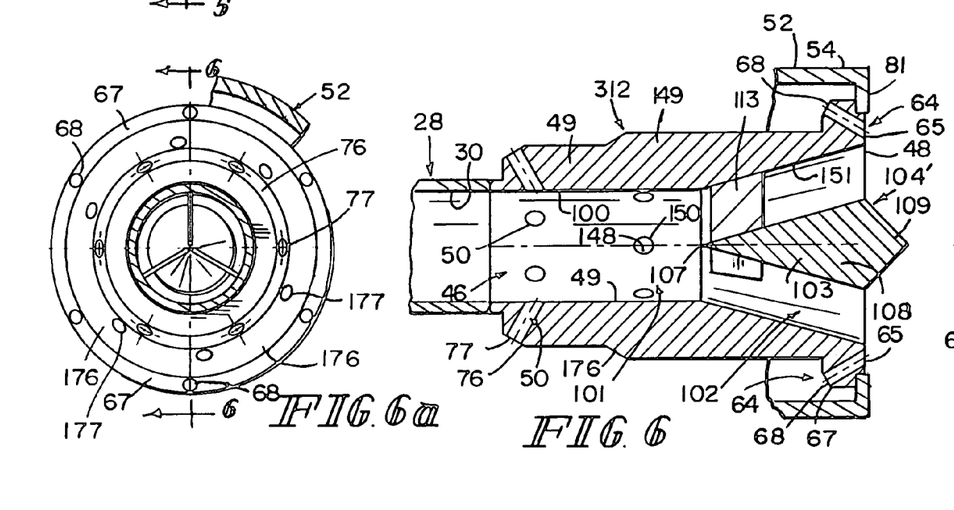
FIG. 6 is a sectional view of a fourth embodiment of an oxygen-fuel nozzle.
FIG. 6a is a sectional view similar to FIG. 3a of the embodiment of FIG. 6.
Figure 6B:
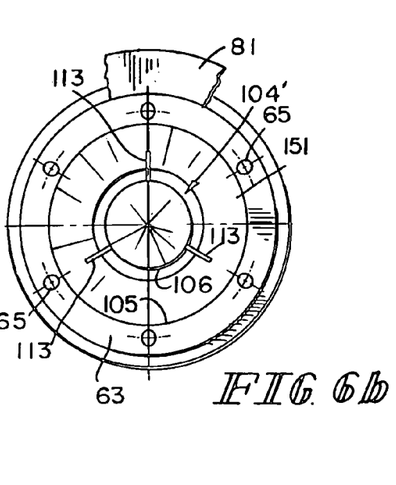
FIG. 6b is an elevation view similar to FIG. 3b of the embodiment of FIG. 6.

In the embodiment of FIGS. 5, 5*a*, and 5*b*, oxygen-fuel nozzle 212 includes upstream oxygen-injection holes 50 and downstream oxygen-discharge passages 64. In the embodiment of FIGS. 6, 6*a*, and 6*b*, oxygen-fuel nozzle 312 further includes auxiliary oxygen-injection holes 150.

Figure 7:
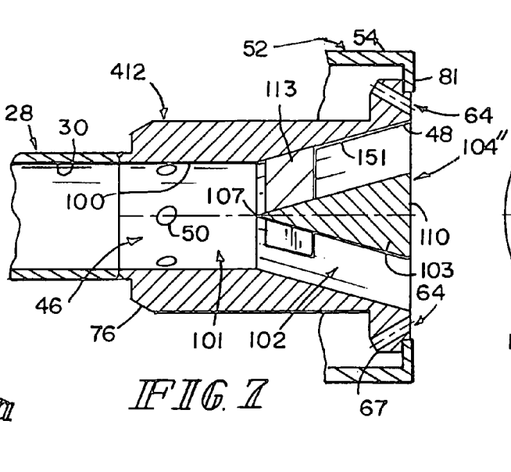
FIG. 7 is a sectional view of a fifth embodiment of an oxygen-fuel nozzle.
Figure 7A:
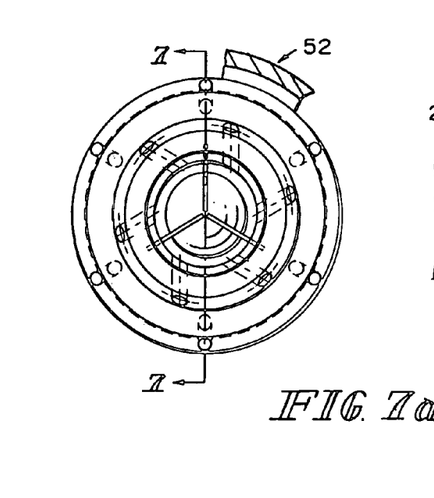
FIG. 7a is a sectional view similar to FIG. 3a of the embodiment of FIG. 7.
Figure 7B:
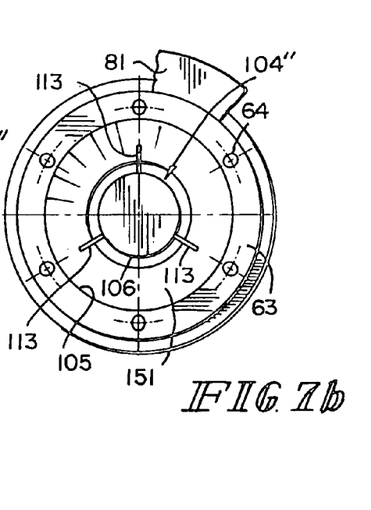
FIG. 7b is an elevation view similar to FIG. 3b of the embodiment of FIG. 7.
Figure 8:
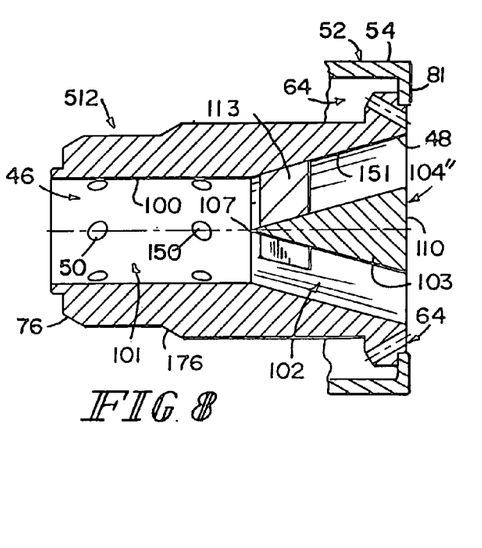
FIG. 8 is a sectional view of a sixth embodiment of an oxygen-fuel nozzle.
Figure 8A:
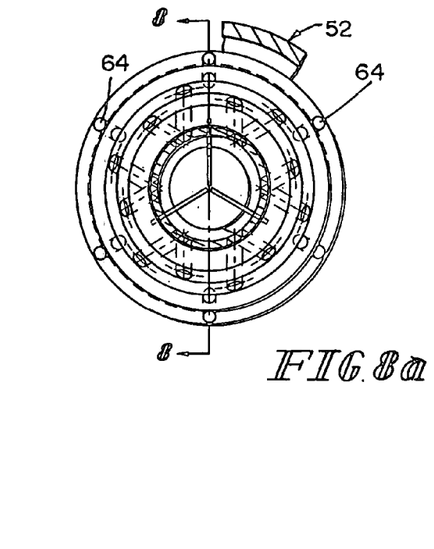
FIG. 8a is a sectional view similar to FIG. 3a of the embodiment of FIG. 8.
Figure 8B:
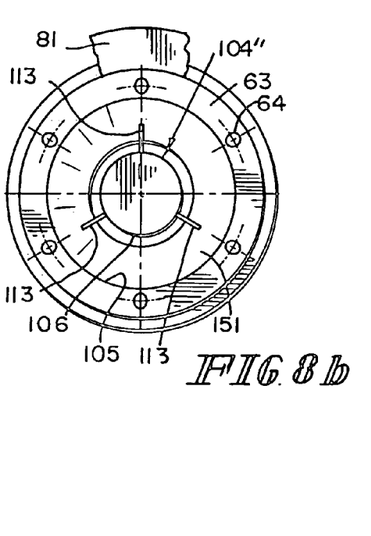
FIG. 8b is an elevation view similar to FIG. 3b of the embodiment of FIG. 8.

In the embodiment of FIGS. 7, 7*a*, and 7*b*, oxygen-fuel nozzle 412 includes upstream oxygen-injection holes 50 and downstream oxygen-discharge passages 64. In the embodiment of FIGS. 8, 5*a*, and 8*b*, oxygen-fuel nozzle 512 further includes oxygen-injection holes 150.

A flow diverter is mounted in oxygen-fuel transport passageway 46 in the embodiments shown in FIGS. 5–8, For example, as shown in FIGS. 5, 5*a*, and 5*b*, oxygen-fuel nozzle 212 includes a cylindrical interior wall 100 communicating with the fuel inlet opening 47 and defining a first-stage portion 101 of oxygen-fuel transport passageway 46. Oxygen-fuel nozzle 212 further includes a frustoconical interior wall 151 extending from cylindrical interior wall 100 to oxygen-fuel outlet opening 48 to diverge in a direction toward oxygen-fuel outlet opening 48 and defining a second-stage portion 102 of oxygen-fuel transport passageway 46. Diverter means 104 is located in second-stage portion 102 for interrupting flow of the combustible oxygen-fuel mixture 27 flowing toward oxygen-fuel outlet opening 48 to cause some of mixture 27 to flow along frustoconical interior wall 151 toward annular oxygen-fuel outlet opening 48.

Oxygen-fuel nozzle 212 includes an outlet end face 63 including a circular interior edge 105 defining an annular outer boundary of oxygen-fuel outlet opening 48. Diverter means 104 includes a circular exterior edge 106 that lies in concentric, spaced-apart relation to the circular interior edge 105 to establish an annular shape of oxygen-fuel outlet opening 48 as suggested in FIG. 5*b*. Diverter means 104 includes an interior cone-shaped portion 103 having an apex 107 positioned to lie at a junction between the first-stage and second-stage portions 101, 102 of oxygen-fuel transport passageway 46. Three fins 113 are used to support interior cone-shaped portion 103 in place as shown in FIG. 5.

As shown in FIG. 5, diverter means 104 further includes a hemisphere-shaped portion 107 coupled to a base 108 of interior cone-shaped portion 103 and arranged to lie outside of oxygen-fuel transport passageway 46. In contrast, in the embodiment of FIG. 6, diverter means 104' further includes an exterior cone-shaped portion 109 coupled to base 108 of the interior cone-shaped portion 103 and arranged to lie outside of oxygen-fuel transport passageway 46. In the embodiments of FIGS. 7 and 8, the interior cone-shaped portion 103 of diverter means 104" includes a flat base 110 including the cylindrical exterior edge 111 and lying in substantially coplanar relation to the outlet end face 63. In the embodiment of FIGS. 5–8, the cylindrical interior wall 100 is formed to include the upstream oxygen-injection holes 50. In the embodiment of FIGS. 6 and 8, the cylindrical interior wall 100 is also formed to include auxiliary oxygen-injection holes 150 located in a region between upstream oxygen-injection holes 50 and the frustoconical interior wall 151.

An oxygen-fuel nozzle 612 is shown in FIGS. 9, 9*a*, 9*b*, and 9*c*. Nozzle 612 includes a discharge plate 900 configured to be mounted in a space provided between a downstream end 901 of annular sleeve 149, and annular lip 81 of outer tube 50. Discharge plate 900 is configured as shown to pass oxygen-fuel mixture 27 through three "rings" of concentric arcuate passages cooperating to define oxygen-fuel outlet 948. Discharge plate 900 includes a center ring 906 partitioned to define four arcuate passages 908, inner ring 910 arranged to surround center ring 906 and partitioned to define four arcuate passages 912, outer ring 914 arranged to surround inner ring 910 and partitioned to define four arcuate passages 916, and middle ring 910 arranged to lie in an annular space between inner and outer rings 910, 914 and partitioned to define four arcuate passages 920. As shown, for example, in FIG. 9, the partition walls that are provided to define the arcuate passages 912, 916, and 920 are frustoconical to cause the oxygen-fuel mixture 27 exiting passages 912, 916, and 920 to spread outwardly in a diverging conical pattern in downstream direction 922. A center passage 924 is provided inside center ring 906.

Figures 9, 9A, 9B, 9C, 9D:
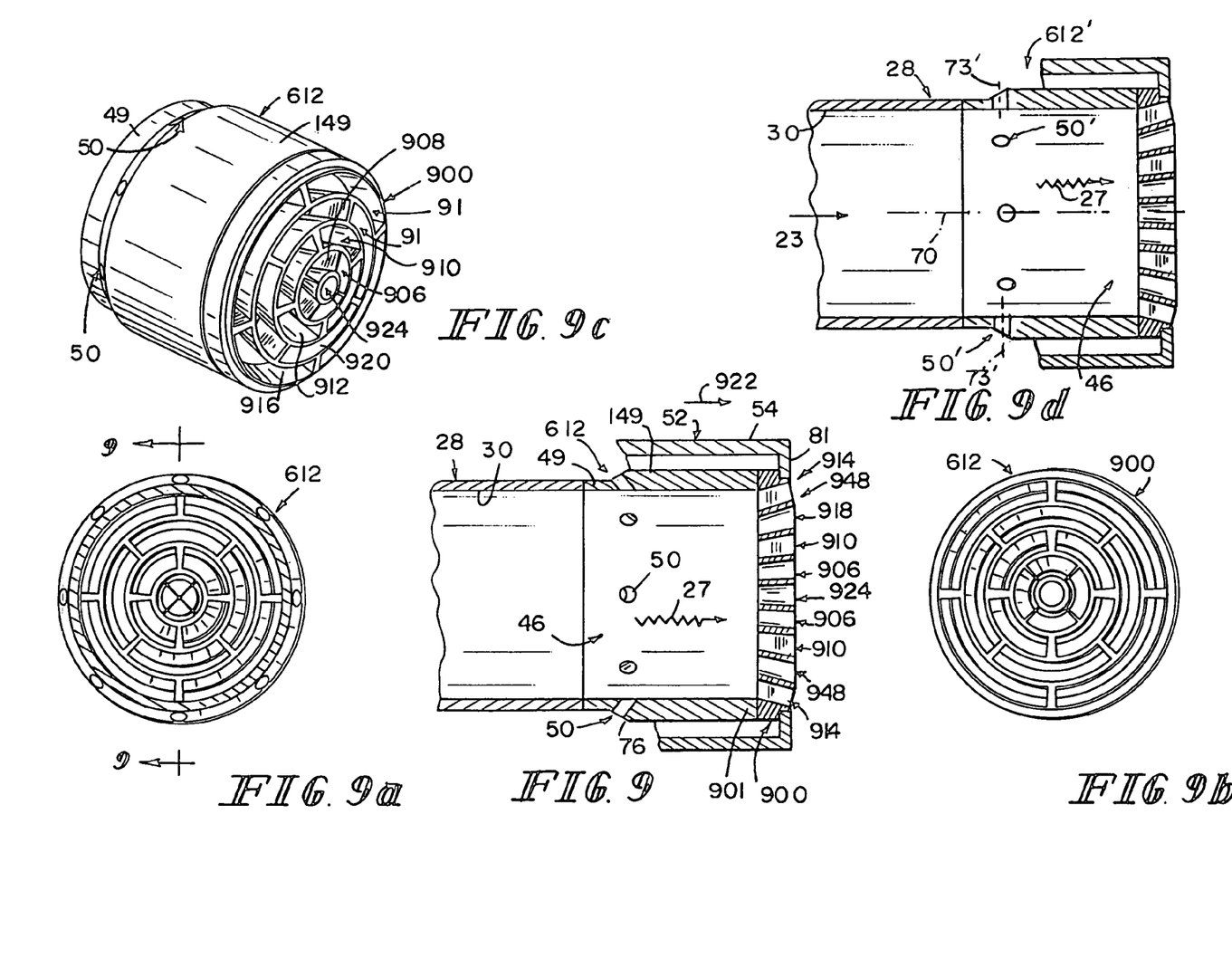
FIG. 9 is a sectional view of a seventh embodiment of an oxygen-fuel nozzle.
FIG. 9a is a sectional view similar to FIG. 3a of the embodiment of FIG. 9.
FIG. 9b is an elevation view similar to FIG. 3b of the embodiment of FIG. 9.
FIG. 9c is a perspective view of the oxygen-fuel nozzle shown in FIGS. 9, 9a, and 9b.
FIG. 9d is a sectional view similar to FIG. 9 showing "perpendicular" oxygen-injection holes rather than the "inclined" oxygen-injection holes shown in FIG. 9.

An oxygen-fuel nozzle similar to nozzle 612 is shown in FIG. 9*d*. In this nozzle 612', oxygen-injection holes 50' are formed to extend along a center line 73' that is perpendicular to center line 70' of oxygen-fuel transport passageway 46. It is within the scope of this disclosure to use such an orientation in any of the other oxygen-fuel nozzle embodiments disclosed herein.

Figure 10A:
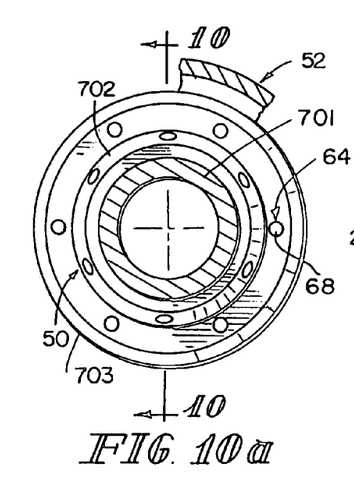
FIG. 10a is a sectional view similar to FIG. 3a of the embodiment of FIG. 10.
Figure 10B:
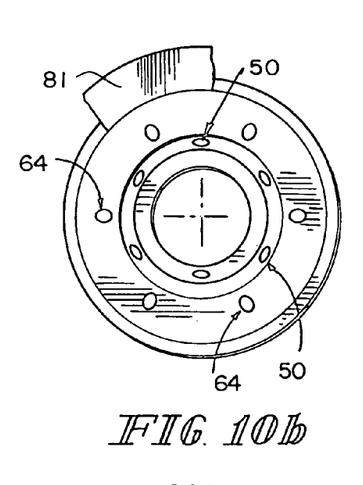
FIG. 10b is an elevation view similar to FIG. 3b of the embodiment of FIG. 10.

In the embodiment of FIGS. 10, 10*a*, and 10*b*, oxygen-fuel nozzle 712 is formed to include three sections: a small-diameter inlet section 701, an expansion section 702, and a large-diameter outlet section 703. Inlet section 701 has a relatively small inner diameter 710 and defines a "high-velocity" passageway 712 that conducts fluidized, pulverized, solid fuel 23 discharged from solid-fuel conduit 28 in downstream direction 72. Outlet section 703 has a relatively large inner diameter 714 and defines a "low-velocity" passageway 716 that conducts the combustible oxygen-fuel mixture 27 to oxygen-fuel outlet opening 48. Expansion section 102 has a frustoconical shape and defines a flow-decelerating passageway 718 that interconnects inlet and outlet sections 701, 703 as suggested in FIG. 10. Expansion section 102 is formed to include oxygen-injection holes 50 for admitting oxygen 44 into passageway 718. Sections 701, 702, and 703 are sized so that the velocity of the mixture 27 flowing in downstream passageway 716 is about the same as the velocity of the mixture 23 flowing in upstream passageway 712 even though oxygen 44 has been introduced through oxygen-injection holes 50.

Figure 11A:
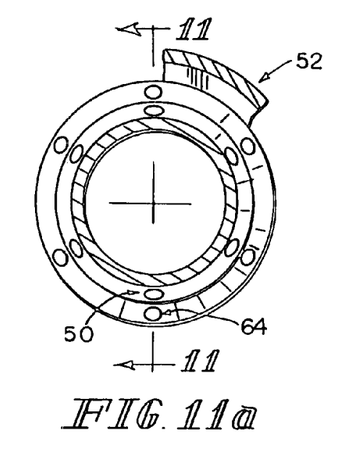
FIG. 11a is a sectional view similar to FIG. 3a of the embodiment of FIG. 11.
Figure 11B:
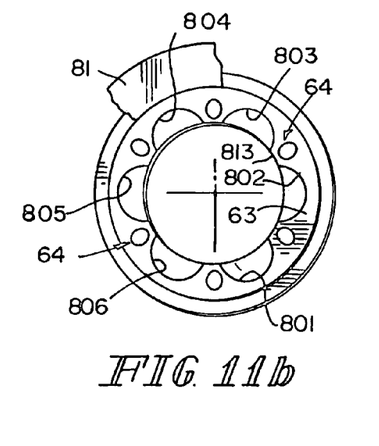
FIG. 11b is an elevation view similar to FIG. 3b of the embodiment of FIG. 11.

In the embodiment of FIGS. 11, 11*a*, and 11*b*, oxygen-fuel nozzle 812 is formed to include circumferentially spaced-apart "flow-expansion" channels 801, 802, 803, 804, 805, and 806 shaped and arranged as shown, for example, in FIGS. 11 and 11*b*. Each of these channels 801–806 has a first opening in inner wall 813 and a second opening in outlet end wall 63 to allow for radial expansion of the combustible oxygen-fuel mixture 27 flowing in oxygen-fuel transport passageway 46' in downstream direction 72 and this expansion leads to enhanced mixing of mixture 27 as it flows through passageway 46' toward oxygen-fuel outlet opening 48. Inner wall 813 has a cylindrical shape in the illustrated embodiment. Bullet-shaped curved walls are formed in oxygen fuel nozzle 812 to define each of channels 801–806 as shown, for example, in FIGS. 11 and 11b.

Figure 12:
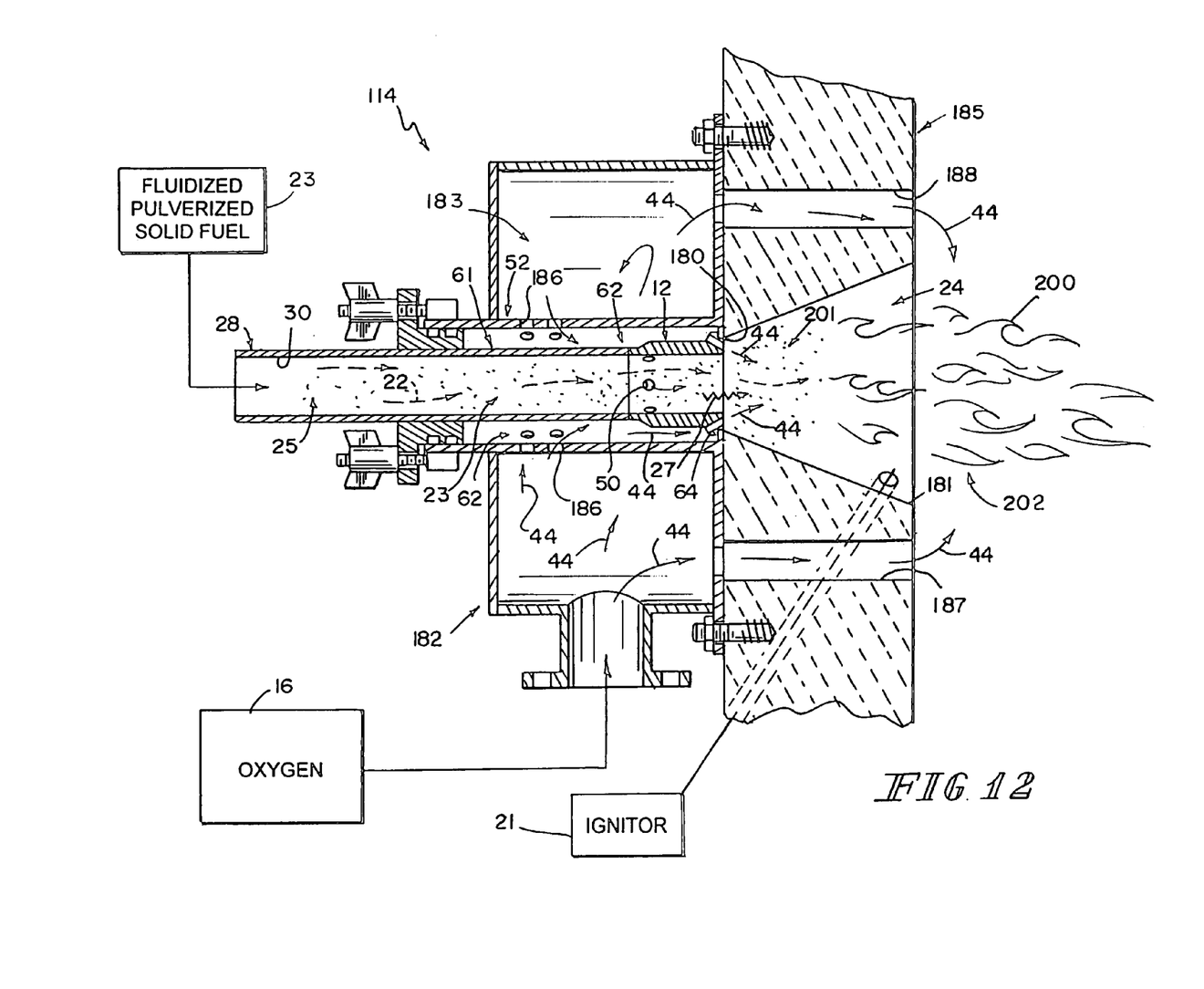
FIG. 12 is a sectional view (similar to FIG. 2) of a second embodiment of an oxygen burner unit according to the present disclosure wherein an oxygen-fuel nozzle according to the present disclosure is mounted in an oxygen supply tube to lie at an inlet port into a flame chamber formed in a burner block and wherein (1) a portion of the oxygen extant in the oxygen supply tube is premixed with fluidized, pulverized solid fuel in the oxygen-fuel nozzle and mixed with oxygenated, fluidized, pulverized, solid fuel just beyond an oxygen-fuel outlet opening formed in the nozzle and (2) another portion of the oxygen extant in the oxygen supply tube is "staged" to bypass the flame chamber by flowing through bypass passageways formed in the burner block to reach the flame at a point outside of the burner block.

In the embodiment illustrated in FIG. 12, burner assembly 114 is situated in a first "staged-oxygen" environment. In contrast, in the embodiment illustrated in FIG. 13, burner assembly 214 is situated in a second "staged-oxygen" environment. In staged oxygen environments, a portion of the combustion oxygen 44 provided by oxygen supply 16 is mixed with fluidized, pulverized, solid fuel 23 in oxygen-fuel nozzle 12 (and also perhaps in the flame chamber 24 just beyond the nozzle 12) to reach a first-stage region 201 near the roof of a flame 200 in flame chamber 24 inside burner block 185. The remaining portion of the combustion oxygen 44 is conducted through bypass passageways formed in burner block 185 to reach a second-stage region 202 at a point closer to the tip of flame 200 outside the burner block 185. Such staged oxygen burner assemblies meter the combustion oxygen to each stage so as to minimize unwanted nitrogen oxide emissions. Reference is hereby made to U.S. Pat. No. 5,458,483, which reference is incorporated by reference herein, for a disclosure of a staged-oxygen burner system for combining fuel and oxygen to produce a flame.

As shown in FIG. 12, burner block 185 is formed to include a flame chamber 24 having an inlet opening 180 and an outlet opening 181. An oxygen-supply housing 182 is coupled to burner block 185 and formed to include a chamber 183 adapted to receive a supply of oxygen 44 from oxygen supply 16. Outer tube 52 extends into chamber 183 of oxygen-supply housing 182 to position oxygen-flow nozzle 12 in chamber 183 to cause oxygen fuel mixture 27 flowing in oxygen-fuel transport passageway 46 and exiting through oxygen-fuel outlet opening 48 to pass into flame chamber 24. First-stage oxygen 44 is discharged from chamber 184 into oxygen flow passage 62 through apertures 186 formed in outer tube 52. Second-stage oxygen 44 flows from chamber 183 through at least two (and preferably four) oxygen-discharge passageways 187, 188 formed in burner block 185 and arranged to bypass flame chamber 24. By diverting some of combustion oxygen through oxygen-discharge passageways 187, 188 toward the tip of flame 200, it is possible to reduce nitrogen oxide emissions.

Figure 13:
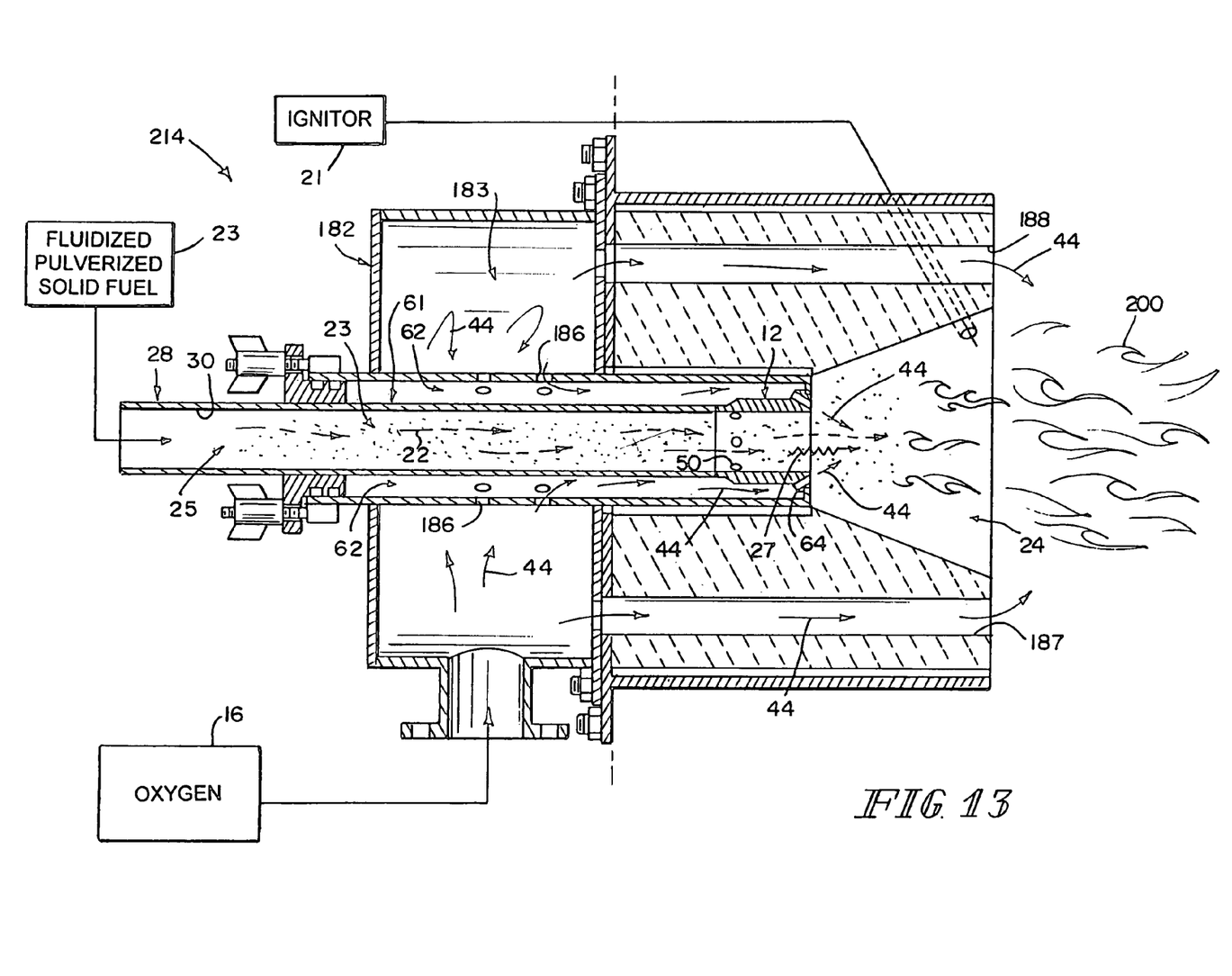

As shown in FIG. 13, burner block 285 is formed to include a flame chamber 24 and a tube receiver passageway 87. The staged-oxygen features illustrated in FIG. 13 are similar to the staged-oxygen features disclosed in the embodiment shown in FIG. 12. The oxygen-fuel nozzle placement illustrated in FIG. 13 is similar to the nozzle placement disclosed in the embodiment shown in FIG. 2.

In this disclosure, a fuel stream comprising a fluidized, pulverized, solid fuel is conveyed through an oxygen-fuel nozzle. Before exiting the oxygen-fuel nozzle, the fuel stream is penetrated by oxygen entering through ports formed in the nozzle. This oxygen mixed with the fuel stream and increases the concentration of oxygen in and around the fuel particles in the fuel stream. The nozzle is resistant to abrasion and erosion from the fuel particles owing to the "straight-through" design with little interference of the fuel stream. Premixing the fuel and oxygen prior to combustion improves flame stability and increases the possibility of using poor quality fuels. The benefits of "staged-oxygen" systems, i.e., low emissions, are more achievable if a stable flame is provided.

Next, the oxygen-fuel mixture exits the oxygen-fuel nozzle, where in one embodiment, the fuel stream is struck again by oxygen that is exiting through parts formed in the face of the oxygen-fuel nozzle. Since the oxygen and fuel are mixed well, a stable flame is maintained in close proximity downstream of the oxygen-fuel nozzle outlet.

As the flame progresses, it burns fuel-rich. This is due to a staged-oxygen design disclosed herein that introduces only a fraction of the required oxygen into the base of the flame, or primary zone. The staged oxygen passes through the orifices in the burner housing and moves toward the downstream portion of the flame—the staged zone. This oxygen represents the balance of the required oxygen to complete combustion of the fuel.

A refractory burner block (optional in some embodiments) helps stabilize the flame, protects the metal components from heat, and conveys the staged oxygen. In an alternative embodiment, the staged oxygen ports are eliminated and the device becomes basically a fuel/oxygen mixing and conveying insert. This insert can be made (using the disclosure provided herein) substantially from available standard pipe and would allow an end user to convert a boiler easily to oxygen/coal combustion.

The use of oxygen, rather than air, increases the available heat to the process, allowing improvements in efficiency. It is expected that this increase in available heat would allow future boilers to gain efficiency over current designs. Lower energy consumption means lower fossil fuel usage, resulting in lower $CO_2$ emissions. By using oxygen for combustion, atmospheric nitrogen (79° of normal combustion air) is eliminated. This reduces the volume of combustion products, thus reducing the size of post-combustion pollution control processes like baghouses and precipitators.

Some coals are poor in quality. Their potential use as a fuel is questionable due to lack of combustion stability. Burning fuels with oxygen increases combustion reactivity and allows poor quality fuels to be burned with stability. There are several countries where poor quality coal exists in large quantities, but cannot be used due to lack of capable combustion technology.

What is claimed is:

1. A burner assembly for combining oxygen and fuel to produce a flame, the burner assembly comprising
   a fuel supply system including a solid-fuel conduit formed to include a fuel transport passageway
   mixing means for mixing a stream of oxygen with fluidized, pulverized, solid fuel conducted through the fuel transport passageway prior to combustion to produce a mixture that can be ignited in a flame chamber to produce a flame
   wherein the mixing means includes an oxygen flow passage and a oxygen-fuel nozzle positioned to lie in the oxygen flow passage and formed to include an oxygen-fuel transport passageway, a fuel inlet opening located to admit fluidized, pulverized, solid fuel discharged from the fuel transport passageway into the oxygen-fuel transport passageway, and an oxygen-fuel outlet opening located to discharge an oxygen-fuel mixture into the flame chamber, and upstream oxygen-injection holes arranged to conduct oxygen flowing in the oxygen flow passage into the oxygen-fuel transport passageway to mix with fluidized, pulverized, solid fuel flowing in the oxygen-fuel transport passageway toward the oxygen-fuel outlet opening to establish a combustible oxygen-fuel mixture flowing in the oxygen-fuel transport passageway and exiting through the oxygen-fuel outlet opening, and wherein the oxygen-fuel nozzle includes a cylindrical interior wall communicating with the fuel inlet opening and defining a first-stage portion of the oxygen-fuel transport passageway and the oxygen-fuel nozzle further includes a frustoconical interior wall extending from the cylindrical interior wall to the oxygen-fuel outlet opening to diverge in a direction toward the oxygen-fuel outlet opening and defining a second-stage portion of the oxygen-fuel transport passageway, and further comprising diverter means located in the second-stage portion for interrupting flow of the combustible oxygen-fuel mixture flowing toward the oxygen-fuel outlet opening to cause some of said mixture to flow along the frustoconical interior wall toward the oxygen-fuel outlet opening.

2. The burner assembly claim 1, wherein the oxygen-fuel nozzle includes an outlet end face including a circular interior edge defining an annular outer boundary of the oxygen-fuel outlet opening and the diverter means includes a circular exterior edge that lies in concentric, spaced-apart relation to the circular interior edge to establish an annular shape of the oxygen-fuel outlet opening.

3. The burner assembly of claim 2, wherein the diverter means includes an interior cone-shaped portion having an apex positioned to lie at a junction between the first-stage and second-stage portions of the oxygen-fuel transport passageway.

4. The burner assembly of claim 3, wherein the diverter means further includes a hemisphere-shaped portion coupled to a base of the interior cone-shaped portion and arranged to lie outside of the oxygen-fuel transport passageway.

5. The burner assembly of claim 3, wherein the diverter means further includes an exterior cone-shaped portion coupled to a base of the interior cone-shaped portion and arranged to lie outside of the oxygen-fuel transport passageway.

6. The burner assembly of claim 3, wherein the interior cone-shaped portion includes a flat base including the cylindrical exterior edge and lying in substantially coplanar relation to the outlet end face.

7. The burner assembly of claim 1, wherein the cylindrical interior wall is formed to include the upstream oxygen-injection holes.

8. The burner assembly of claim 7, wherein the cylindrical interior wall is formed to include auxiliary oxygen-injection holes located in a region between the upstream oxygen-injection holes and the frustoconical interior wall.

* * * * *